US012646019B2

(12) United States Patent
Kim

(10) Patent No.: US 12,646,019 B2
(45) Date of Patent: Jun. 2, 2026

(54) APPARATUS AND METHOD FOR OPERATING BLASTING MANAGEMENT APPLICATION

(71) Applicant: HANWHA CORPORATION, Seoul (KR)

(72) Inventor: Jong Yeop Kim, Seongnam-si (KR)

(73) Assignee: HANWHA CORPORATION, Seoul (KR)

( * ) Notice: Subject to any disclaimer, the term of this patent is extended or adjusted under 35 U.S.C. 154(b) by 393 days.

(21) Appl. No.: 18/279,104

(22) PCT Filed: Jul. 7, 2023

(86) PCT No.: PCT/KR2023/009653
§ 371 (c)(1),
(2) Date: Aug. 28, 2023

(87) PCT Pub. No.: WO2024/162538
PCT Pub. Date: Aug. 8, 2024

(65) Prior Publication Data
US 2025/0029025 A1 Jan. 23, 2025

(30) Foreign Application Priority Data
Feb. 1, 2023 (KR) ........................ 10-2023-0013430

(51) Int. Cl.
*G06Q 10/0631* (2023.01)
*G06F 16/901* (2019.01)
*G06F 16/908* (2019.01)

(52) U.S. Cl.
CPC ..... *G06Q 10/06311* (2013.01); *G06F 16/908* (2019.01); *G06F 16/9024* (2019.01)

(58) Field of Classification Search
CPC .. G06Q 10/06311; G06Q 10/06; G06Q 10/10; G06Q 50/02; G06Q 50/08;
(Continued)

(56) References Cited

U.S. PATENT DOCUMENTS

2011/0153541 A1* 6/2011 Koch ..................... G06Q 10/06
706/52

FOREIGN PATENT DOCUMENTS

WO 2022/016207 A1 1/2022

OTHER PUBLICATIONS

Chen et al., "Calculation of blast hole charge amount based on three-dimensional solid model of blasting rock mass," scientific reports, published on Jan. 11, 2022 (14 pages).
(Continued)

*Primary Examiner* — Daryl C Pope
(74) *Attorney, Agent, or Firm* — WHDA, LLP

(57) ABSTRACT

Proposed are an apparatus and a method for operating a blasting management application in which blast hole checking information is generated and provided by receiving blast bole information including at least one of blast hole detail information, blast hole design information, blast hole arrangement information, and additional blast bole information for a blast design work of at least one of blast lists selected through the worker terminal so that change in depth of a blast hole over time is identified before charging, thereby taking a measure such as changing a charging/delay time design or instructing an additional drilling work.

7 Claims, 22 Drawing Sheets

(58) Field of Classification Search
CPC .............. G06Q 50/10; G06Q 10/0631; G06Q
10/0633; G06Q 10/103; G06F 16/908;
G06F 16/9024; F42D 1/04; F42D 1/08;
F42D 3/04
See application file for complete search history.

(56) References Cited

OTHER PUBLICATIONS

"BlastLogic 2020 Advanced blast design and reconciliation," published on Jul. 13, 2020, available at: https://www.youtube.com/watch?v=o36DxYk-_cQ (2 pages).

Soft-Blast, 'JKSimBlast—blast simulation evaluation and management User Guide', published Jun. 13, 2018 as per WayBack Machine. URL:<https://web.archive.org/web/20180613190632/https://www.soft-blast.com/Support/Downloads/JKSimBlast_A5>.

O-PitBlast, 'User Manual 2.0', published 2018. URL: <https://downloads.o-pitblast.com/files/manual/O-Pitblast%20Manual%20v2.0.pdf>.

* cited by examiner

Figure 9:
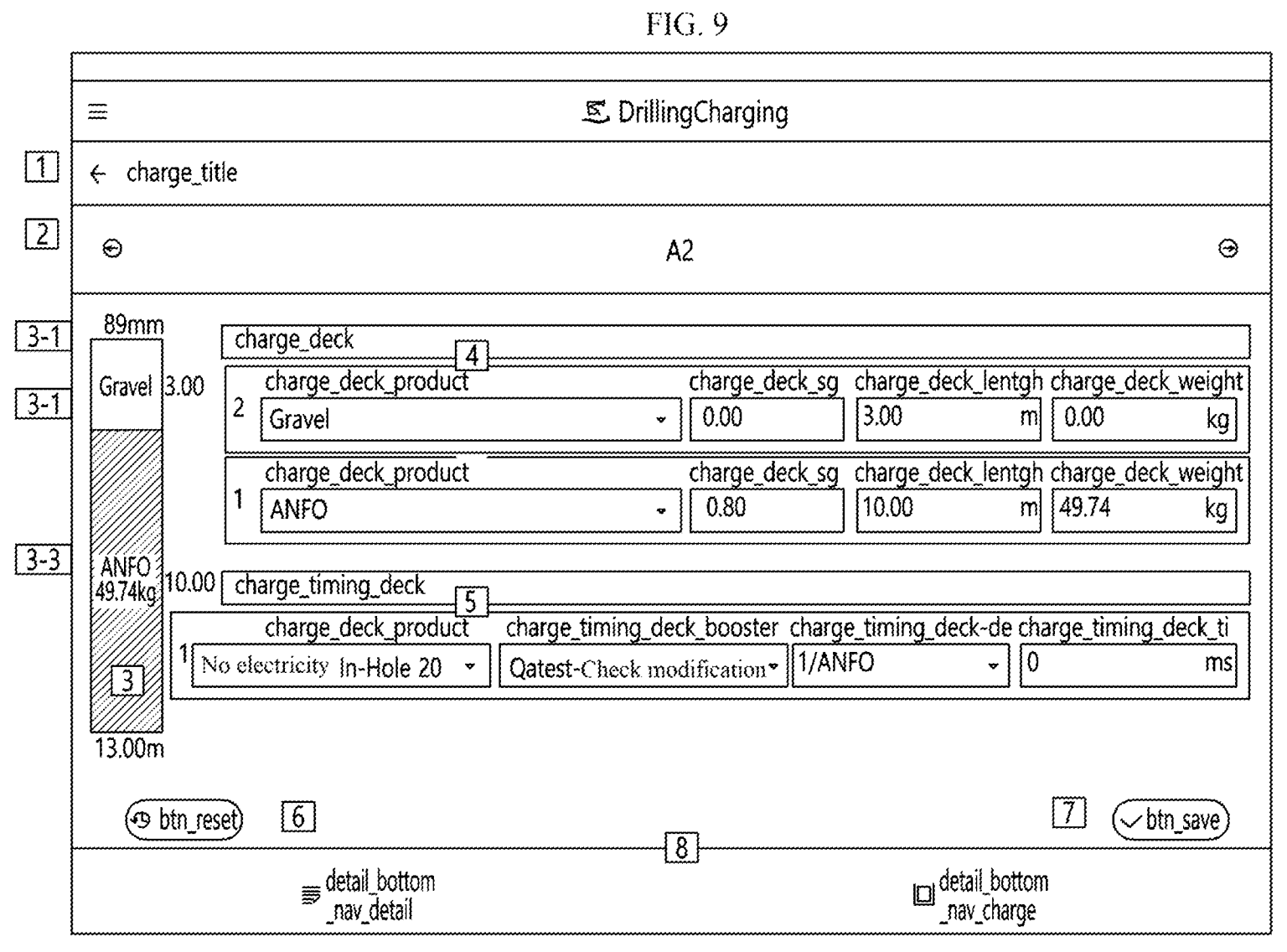

⬅ charge_title

🖹 DrillingCharging

A2

⚙

📶

89mm

Gravel 3.00

ANFO
49.74kg 13.00m 10.00

[3]

charge_deck

[4]

charge_deck_product    charge_deck_sg    charge_deck_lentgh    charge_deck_weight 2 | Gravel    ▾    | 0.00    | 3.00    m | 0.00    kg charge_deck_product    charge_deck_sg    charge_deck_lentgh    charge_deck_weight 1 | ANFO    ▾    | 0.80    | 10.00    m | 49.74    kg charge_timing_deck

[5]

charge_deck_product    charge_timing_deck_booster    charge_timing_deck-de    charge_timing_deck_ti 1 | No electricity In-Hole 20    ▾ | Qatest-Check modification ▾ | 1/ANFO    ▾ | 0    ms

[6]

↻ btn_reset

[8]

[7]

✓ btn_save

≡ detail_bottom
_nav_detail

🔲 detail_bottom
_nav_charge

✐) DrillingCharging

| cup_weight_header_mpu | cup_weight_header_0 | cup_weight_header_5 | cup_weight_header_10 | cup_weight_header_20 | cup_weight_header_30 |
|---|---|---|---|---|---|
| AsiaMPU01 | | | | | |

| cup_weight_header_mpu | cup_weight_header_0 | cup_weight_header_5 | cup_weight_header_10 | cup_weight_header_20 | cup_weight_header_30 |
|---|---|---|---|---|---|
| QATEST-MPU01 | | | | | | cup_weight_select

✐) upload_success_title
   upload_success_body

⟲ cup_weight_upload 3-1

FIG. 12c

↳) DrillingCharging

| cup_weight_header_mpu | cup_weight_header_0 | cup_weight_header_5 | cup_weight_header_10 | cup_weight_header_20 | cup_weight_header_30 |
|---|---|---|---|---|---|
| AsiaMPU01 | | | | | |

| cup_weight_header_mpu | cup_weight_header_0 | cup_weight_header_5 | cup_weight_header_10 | cup_weight_header_20 | cup_weight_header_30 |
|---|---|---|---|---|---|
| QATEST-MPU01 | | | | | |

| cup_weight_header_mpu | cup_weight_header_0 | cup_weight_header_5 | cup_weight_header_10 | cup_weight_header_20 | cup_weight_header_30 |
|---|---|---|---|---|---|
| QATEST-MPU01 | | | | | |

| cup_weight_header_mpu | cup_weight_header_0 | cup_weight_header_5 | cup_weight_header_10 | cup_weight_header_20 | cup_weight_header_30 |
|---|---|---|---|---|---|
| QATEST-MPU01 | | | | | | cup_weight_select ( ⊕ cup_weight_upload )

↳) upload_fail_title
upload_fail_no_network 3-2

APPARATUS AND METHOD FOR OPERATING BLASTING MANAGEMENT APPLICATION

TECHNICAL FIELD

The present disclosure relates, in general, to an apparatus and a method for operating a blasting management application and, more particularly, to an apparatus and a method for operating a blasting management application in which blast hole checking information is generated and provided by receiving blast hole information including at least one of blast hole detail information, blast hole design information, blast hole arrangement information, and additional blast hole information for blast design work of at least one of blast lists so that an optimal blast design can be derived.

BACKGROUND ART

In general, a blast system for exploding and collapsing by using explosives is used in construction fields such as blasting of rocks, blasting of abandoned buildings, and open-air blasting.

Specifically, a region or object to be blasted is divided into a plurality of sections, and a plurality of blast holes into which explosives are inserted for each section are drilled. After charging an explosive into each of the drilled blast holes, the blast hole is connected to a blasting device. By detonating detonators located in the blast holes, the explosives are detonated and the object to be blasted explodes and collapses.

Regarding the operation of the blast system, conventionally, each process has been performed directly by a human or by a machine manipulated by a human. However, there was a possibility that human error may occur in such a conventional blast system. In addition, there was a problem that the blast result of the blast system did not satisfy required conditions due to the error.

In addition, work such as drilling and charging may cause a difference between a blast design and an actual work result, and the difference is large. Since the conventional blast design system predicts a blast result on the premise that work is accurately performed according to the blast design, there was a problem in that an actual blast result could not be reflected. Therefore, when comparing blast results by using blast prediction data and result data in the conventional blast design system, there is a problem in that meaningful result values cannot be derived.

In this regard, Korean Patent Application Publication No. 10-2021-0113269 discloses "SYSTEMS FOR AUTOMATED BLAST DESIGN PLANNING AND METHODS RELATED THERETO".

DISCLOSURE

Technical Problems

The present disclosure has been made to solve the above problems, and the present disclosure is intended to propose an apparatus and a method for operating a blasting management application in which blast hole checking information is generated and provided by receiving blast hole information including at least one of blast hole detail information, blast hole design information, blast hole arrangement information, and additional blast hole information for blast design work of at least one of blast lists selected through a worker terminal.

In addition, the present disclosure is intended to propose an apparatus and a method for operating a blasting management application in which the apparent specific gravity information of a blast hole applied to blast design work selected through the worker terminal is input and provided.

In addition, the present disclosure is intended to propose an apparatus and a method for operating a blasting management application in which blast hole stemming checking information is generated and provided by receiving stemming information of a blast hole applied to blast design work selected through the worker terminal.

Technical Solution

In order to achieve the above objectives, an apparatus for operating a blasting management application according to the present disclosure includes: a worker login execution part configured to perform a login to a blasting management application through a worker terminal; a blast list providing part configured to provide blast lists selected through the worker terminal to the worker terminal; a blast hole checking information providing part configured to generate and provide blast hole checking information by receiving blast hole information including at least one of blast hole detail information, blast hole design information, blast hole arrangement information, and additional blast hole information for blast design work of at least one of the blast lists selected through the worker terminal; a blast hole apparent specific gravity information providing part configured to receive and provide apparent specific gravity information of a blast hole applied to the blast design work selected through the worker terminal; and a blast hole stemming checking information providing part configured to generate and provide blast hole stemming checking information by receiving stemming information of the blast hole applied to the blast design work selected through the worker terminal.

In addition, the blast list providing part may provide a blast design work list including at least one of an explosion name, an upload date, a blast plan date, a drilling progress situation, and a charging progress situation.

In addition, the blast hole checking information providing part may include: a blast hole detail information generation part configured to generate blast hole detail information including at least one of an ID, a position, a size, and a weight of each of multiple blast holes; a blast hole design information generation part configured to generate blast hole design information including at least one of deck charging information and deck timing information of each of multiple blast holes; a blast hole arrangement information generation part configured to generate blast hole arrangement information including arrangement information for each path in which multiple blast holes are located; and an additional blast hole information generation part configured to generate information of at least one additional blast hole.

In addition, when charging an explosive into the blast hole, the blast hole apparent specific gravity information providing part may receive the apparent specific gravity information according to a weight of the blast hole measured according to change of time after placing the explosive in a measuring cup.

The blast hole stemming checking information providing part may generate and provide the blast hole stemming checking information on a basis of blast hole stemming information including at least one of an initial length of the blast hole, a volume of an explosive charged in the blast hole, a type of a stemming material filled in space remaining after charging the explosive into the blast hole, and a length of the stemming material excluding the explosive inside the blast hole.

In addition, the apparatus may further include: a setting part configured to set a language displayed in the blasting management application, to set a display period of the blast list, and to set a unit system through the worker terminal.

In order to achieve the above objectives, a method for operating a blasting management application according to the present disclosure includes: performing a login to the blasting management application through the worker terminal; providing the blast lists selected through the worker terminal; generating and providing the blast hole checking information by receiving blast hole information including at least one of blast hole detail information, blast hole design information, blast hole arrangement information, and additional blast hole information for blast design work of at least one of the blast lists selected through the worker terminal; receiving and providing the apparent specific gravity information of a blast hole applied to the blast design work selected through the worker terminal and generating and providing the blast bole stemming checking information by receiving stemming information of the blast hole applied to the blast design work selected through the worker terminal.

In addition, in the providing of the blast lists to the worker terminal, the blast design work list including at least one of an explosion name, an upload date, a blast plan date, a chilling progress situation, and a charging progress situation may be provided.

In addition, the generating and providing of blast hole checking information by receiving blast hole information including at least one of blast hole detail information, blast hole design information, blast hole arrangement information, and additional blast hole information for blast design work of at least one of blast lists may include: generating the blast hole detail information including at least one of an ID, a position, a size, and a weight of each of multiple blast holes; generating the blast hole design information including at least one of deck charging information and deck timing information of each of multiple blast holes; generating the blast hole arrangement information including arrangement information for each path in which multiple blast holes are located; and generating information of at least one additional blast hole.

In addition, in the receiving and providing of apparent specific gravity information of a blast bole applied to the blast design work, when charging an explosive into the blast hole, the apparent specific gravity information according to a weight of the blast hole measured according to change of time after placing the explosive in a measuring cup may be received.

In addition, in the generating and providing of blast hole stemming checking information by receiving stemming information of the blast hole applied to the blast design work, the blast hole stemming checking information may be generated and provided on a basis of the blast hole stemming information including at least one of an initial length of the blast hole, a volume of an explosive charged in the blast hole, a type of a stemming material filled in space remaining after charging the explosive into the blast hole, and a length of the stemming material excluding the explosive inside the blast hole.

Advantageous Effects

The present disclosure relates to the apparatus for operating a blasting management application, and blast hole checking information is generated and provided by receiving blast hole information including at least one of blast hole detail information, blast hole design information, blast hole arrangement information, and additional blast hole information for blast design work of at least one of blast lists selected through the worker terminal so that change in depth of a blast hole over time is identified before charging, thereby enabling measures such as changing a charging delay time design or instructing additional chilling work to be taken.

In addition, according to the present disclosure, the apparent specific gravity information of a blast hole applied to the blast design work selected through the worker terminal is input and provided, thereby proceeding with stemming work when apparent specific gravity of the blast hole is appropriate and computerizing and recording the proceeding.

In addition, according to the present disclosure, the blast hole stemming checking information is generated and provided by receiving stemming information of a blast hole applied to blast design work selected through the worker terminal so as to calculate the current volume of an explosive by using a value of change in the apparent specific gravity of the blast hole and inform a worker of how much space is left, thereby deriving an optimal blast design.

DESCRIPTION OF DRAWINGS

FIGS. 3 to 15 are diagrams illustrating the screen configuration of a worker terminal proposed by the method for operating a blasting management application according to the present disclosure the method for operating a blasting management application according to the present disclosure.

DESCRIPTION OF THE REFERENCE NUMERALS IN THE DRAWINGS

Figure 1:
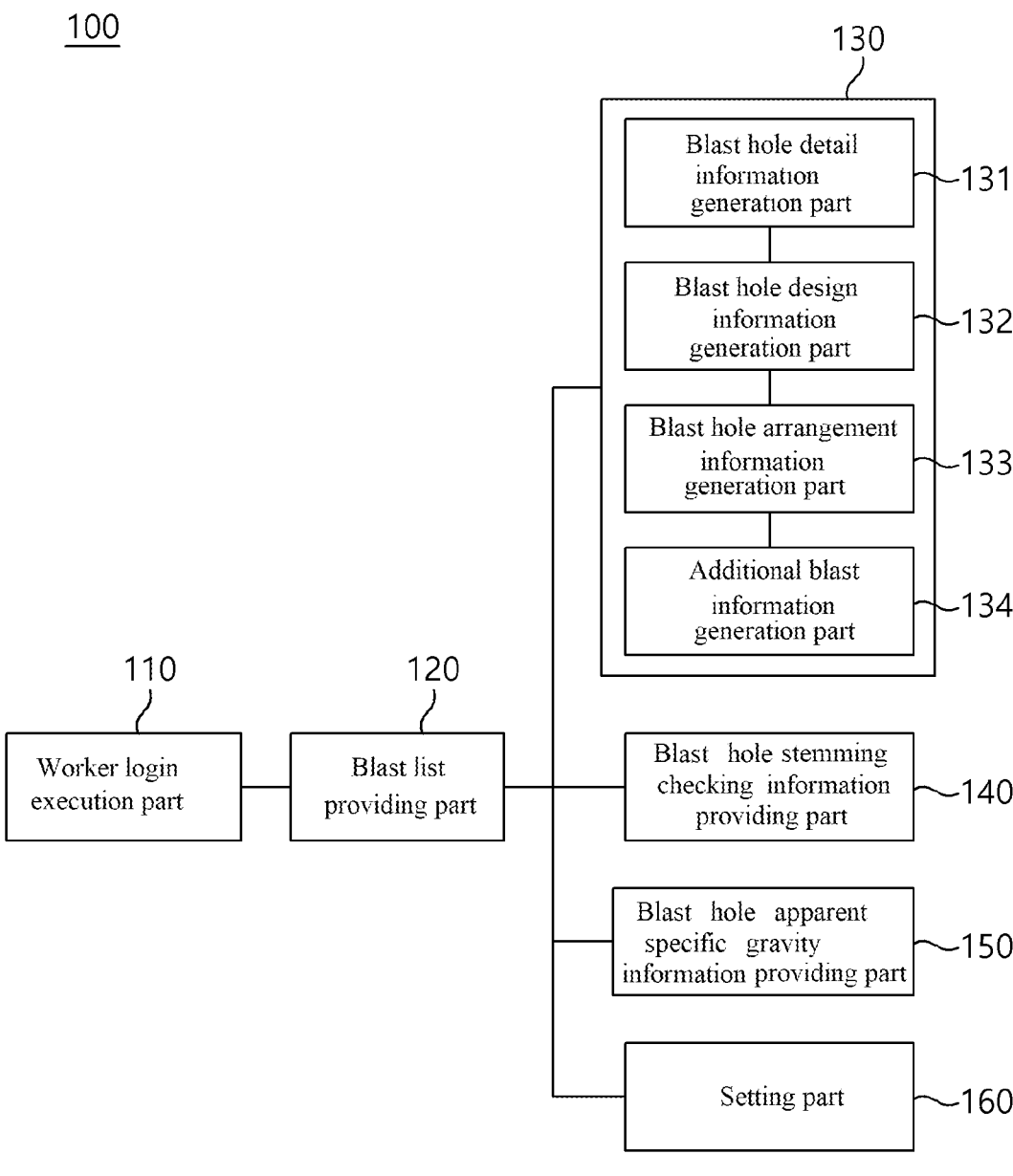
FIG. 1 is a diagram illustrating the configuration of an apparatus for operating a blasting management application according to the present disclosure.

100: Apparatus for operating a blasting management application
110: Worker login execution part
120: Blast list providing part
130: Blast hole checking information providing part
140: Blast hole stemming checking information providing part
150: Blast hole apparent specific gravity information providing part
160: Setting part

BEST MODE

The present disclosure may be subject to various changes and may have multiple embodiments, and specific embodiments are illustrated in the drawings and described in detail.

However, this is not intended to limit the present disclosure to the specific embodiments, and should be understood to include all changes, equivalents, or substitutes included in the spirit and technical scope of the present disclosure. Like reference numbers have been used for like elements throughout the description of each of the drawings.

It should be understood that when an element is referred to as being "coupled" or "connected" to another element, it may be directly coupled or connected to the other element or intervening elements may be present therebetween. In contrast, it should be understood that when an element is referred to as being "directly coupled" or "directly connected" to another element, there are no intervening elements present therebetween.

Terms used in this specification are only used to describe specific embodiments, and are not intended to limit the present disclosure. Singular expressions include plural expressions unless the context clearly dictates otherwise. It should be understood that terms such as "include", and "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, with reference to the accompanying drawings, exemplary embodiments of the present disclosure will be described in more detail. Hereinafter, the same reference numerals are used for the same components in the drawings, and redundant descriptions of the same components are omitted.

FIG. 1 is a diagram illustrating the configuration of an apparatus for operating a blasting management application according to the present disclosure.

Referring to FIG. 1, the apparatus 100 for operating a blasting management application according to the present disclosure largely includes the worker login execution part 110, a blast list providing part 120, a blast hole checking information providing part 130, a blast hole stemming checking information providing part 140, a blast hole apparent specific gravity information providing part 150, and a setting part 160.

The worker login execution part 110 performs a login to a blasting management application through a worker terminal.

The blast list providing part 120 provides blast lists selected through the worker terminal to the worker terminal.

The blast list providing part 120 may provide a blast design work list including at least one of an explosion name, an upload date, a blast plan date, a drilling progress situation, and a charging progress situation.

The blast hole checking information providing part 130 generates and provides the blast hole checking information by receiving blast hole information including at least one of blast hole detail information, blast hole design information, blast hole arrangement information, and additional blast hole information for blast design work of at least one of blast lists selected through the worker terminal. In the blast hole checking information providing part 130, the depth of a blast hole may change due to the collapse of drilled blast hole since there is time interval during blast design work. By identifying this change before charging, a charging/delay time design may be changed or additional drilling work may be added.

To this end, the blast hole checking information providing part 130 may include a blast hole detail information generation part 131, a blast hole design information generation part 132, a blast hole arrangement information generation part 133, and an additional blast hole information generation part 134.

The blast hole detail information generation part 131 generates the blast hole detail information including at least one of an ID, a position, a size, and a weight of each of multiple blast boles.

The blast hole design information generation part 132 generates blast hole design information including at least one of deck charging information and deck timing information of each of multiple blast holes.

The blast hole arrangement information generation part 133 generates the blast hole arrangement information including arrangement information for each path in which multiple blast holes are located.

The additional blast hole information generation part 134 generates information of at least one additional blast hole.

The blast hole apparent specific gravity information providing part 140 receives and provides the apparent specific gravity information of a blast hole applied to the blast design work selected through the worker terminal.

When charging an explosive into the blast hole, the blast hole apparent specific gravity information providing part 140 receives the apparent specific gravity information according to a weight of the blast hole measured according to change of time after placing the explosive in a measuring cup. Here, a foaming agent is used as a premonitory material of the explosive, and this is called as gassing. The premonitory material lowers the density of an explosive to an appropriate level and plays a role in making detonation of the explosive easier. When the apparent specific gravity becomes appropriate, stemming is performed.

The blast hole stemming checking information providing part 150 generates and provides the blast hole stemming checking information by receiving stemming information of the blast hole applied to the blast design work selected through the worker terminal.

The blast hole stemming checking information providing part 150 generates and provides the blast hole stemming checking information on the basis of blast hole stemming information including at least one of an initial length of a blast hole, a volume of an explosive charged in the blast hole, a type of a stemming material filled in space remaining after charging the explosive into the blast hole, and a length of the stemming material excluding the explosive inside the blast hole. That is, the blast hole stemming checking information providing part 150 records how much portion of space remaining after the explosive is charged in the blast hole is filled with what stemming material. In addition, the blast hole stemming checking information providing part 150 may inform a worker of how much space is left after calculating the current volume of an explosive by using the previously measured apparent specific gravity information.

The setting part 160 sets a language displayed in the blasting management application, sets a display period of a blast list, and sets a unit system though the worker terminal.

Figure 2:
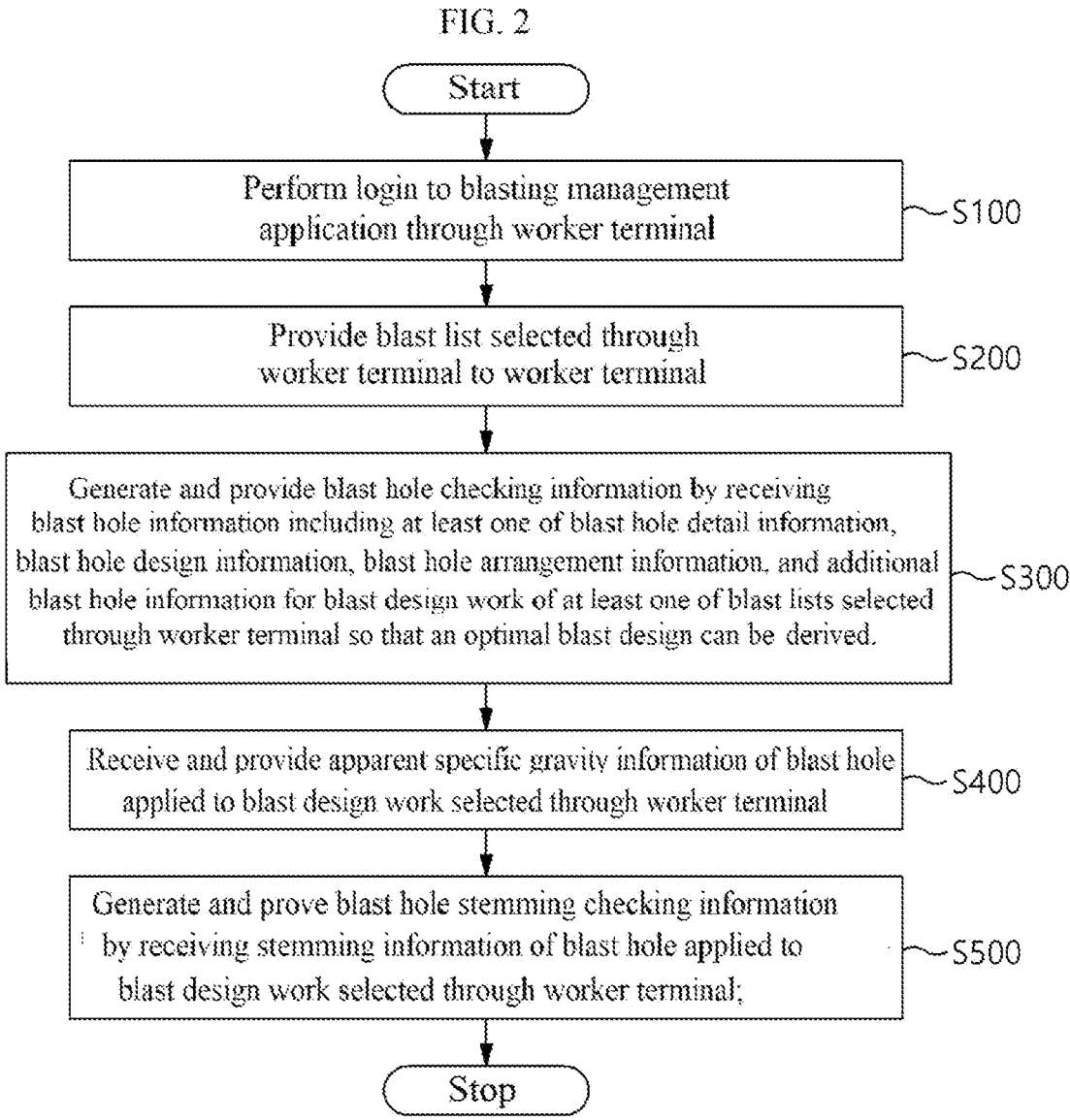
FIG. 2 is a flowchart illustrating the order of a method for operating a blasting management application according to the present disclosure.

FIG. 2 is a flowchart illustrating the order of the method for operating a blasting management application according to the present disclosure.

Referring to FIG. 2, the method for operating a blasting management application according to the present disclosure uses the apparatus for operating a blasting management application according to the present disclosure described above, and redundant descriptions thereof will be omitted below.

First, through the worker terminal, login to the blasting management application is performed at S100.

Next, the blast lists selected through the worker terminal are provided to the worker terminal at S200.

Next, the blast list providing part may provide the blast design work list including at least one of an explosion name, an upload date, a blast plan date, a drilling progress situation, and a charging progress situation at S300.

Next, the blast hole checking information is generated and provided by receiving the blast hole information including at least one of blast hole detail information, blast hole design information, blast hole arrangement information, and additional blast hole information for the blast design work of at least one of the blast lists selected through the worker terminal at S400.

At S400, the depth of a blast hole may change due to the collapse of a drilled blast hole since there is time interval during the blast design work. By identifying this change before charging, a charging/delay time design may be changed or additional drilling work may be added.

To this end, at S400, the blast hole detail information including at least one of an ID, a position, a size, and a weight of each of multiple blast holes is generated, the blast hole design information including at least one of deck charging information and deck timing information of each of multiple blast holes is generated, the blast hole arrangement information including arrangement information for each path in which multiple blast holes are located is generated, and information of at least one additional blast hole is generated.

Next, the apparent specific gravity information of a blast hole applied to the blast design work selected through the worker terminal is input and provided at S500.

At S500, when charging an explosive in the blast hole, the apparent specific gravity information according to the weight of the blast hole measured according to change of time after placing the explosive in the measuring cup is received.

Next, the blast hole stemming checking information is generated and provided by receiving stemming information of the blast hole applied to the blast design work selected through the worker terminal at S600.

At S600, the blast hole stemming checking information is generated and provided on the basis of blast hole stemming information including at least one of an initial length of a blast hole, a volume of an explosive charged in the blast hole, a type of a stemming material filled in space remaining after changing the explosive into the blast hole, and a length of the stemming material excluding the explosive inside the blast hole.

That is, at S500, how much portion of space remaining after the explosive is charged in the blast hole is filled with what stemming material may be recorded, and after the current volume of an explosive is calculated by using the previously measured apparent specific gravity information, how much space is left may be informed to a worker.

FIGS. 3 to 14b are diagrams illustrating the screen configuration of the worker terminal proposed by the method for operating a blasting management application according to the present disclosure.

Figure 3:
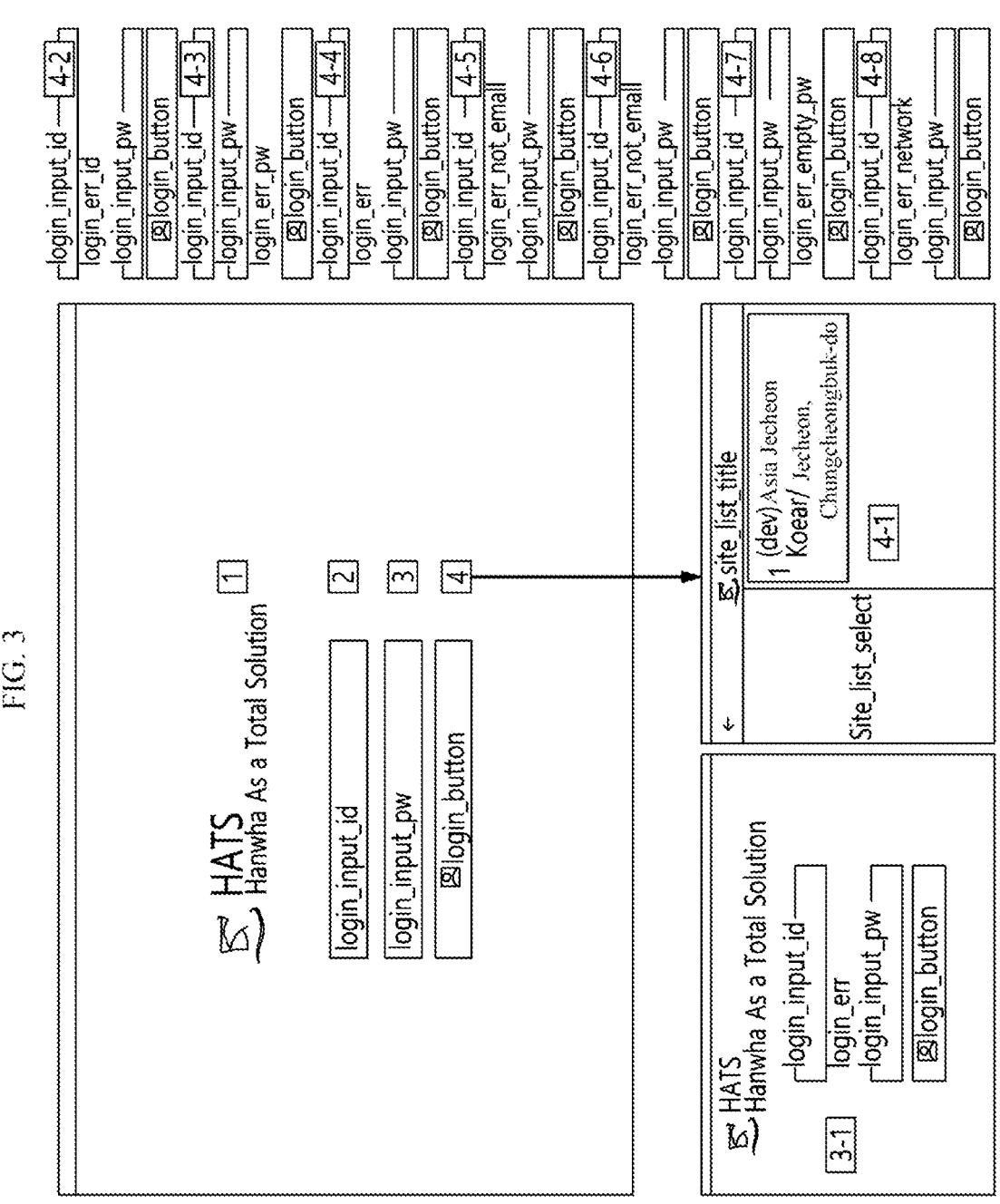

FIG. 3 is a login screen, which displays 1. Logo, 2. DD input 3. Password input. 3-1. ObscureText process, 4-1. When login is successful, a site selection screen is displayed, when a site is not selected, it is impossible to enter a main screen, when an app is restarted after the app is closed in a state in which a site is unselected, logout is processed and the login screen is displayed, when the site is selected by touching, a Yes/No message box is displayed (when Yes is selected, move to a Blast List screen, but when No is selected, Site list is displayed continuously), after the Blast List screen is entered after selection of Site, when an app is restarted after the app is closed, a login process is omitted, and the Blast List screen is displayed with a user account before closing the app. 4-2. Login failure: ID that doesn't exist, 4-3. Login failure: PW does not match, 4-4. Login failure: other than ID/PW, 4-5. ID not entered, 4-6. ID is not in an email format, 4-7. PW not input, and 4-8. Network error is displayed.

Figure 4:
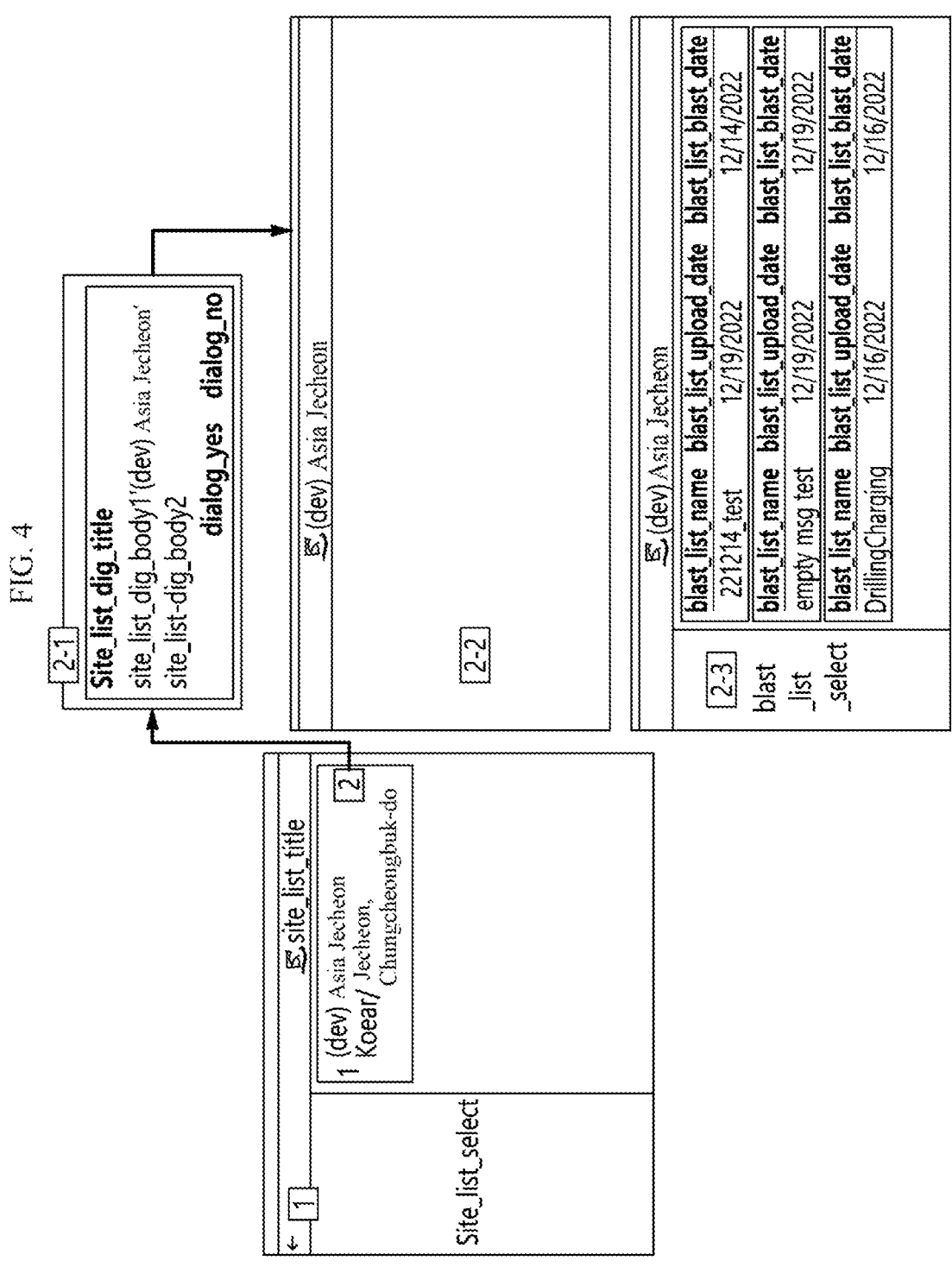

FIG. 4 is the site list of a login screen, which displays 1. Back button, 2. Site List-scroll when the number of lists exceeds the screen, —Site name, display country and location, 2-1. When selecting a site, confirmation window message box Yes/No, 2-2. When [Yes] is selected in the confirmation window, move hole checking, and 2-3. Since blast is unselected, move directly to blast List.

Figure 5:
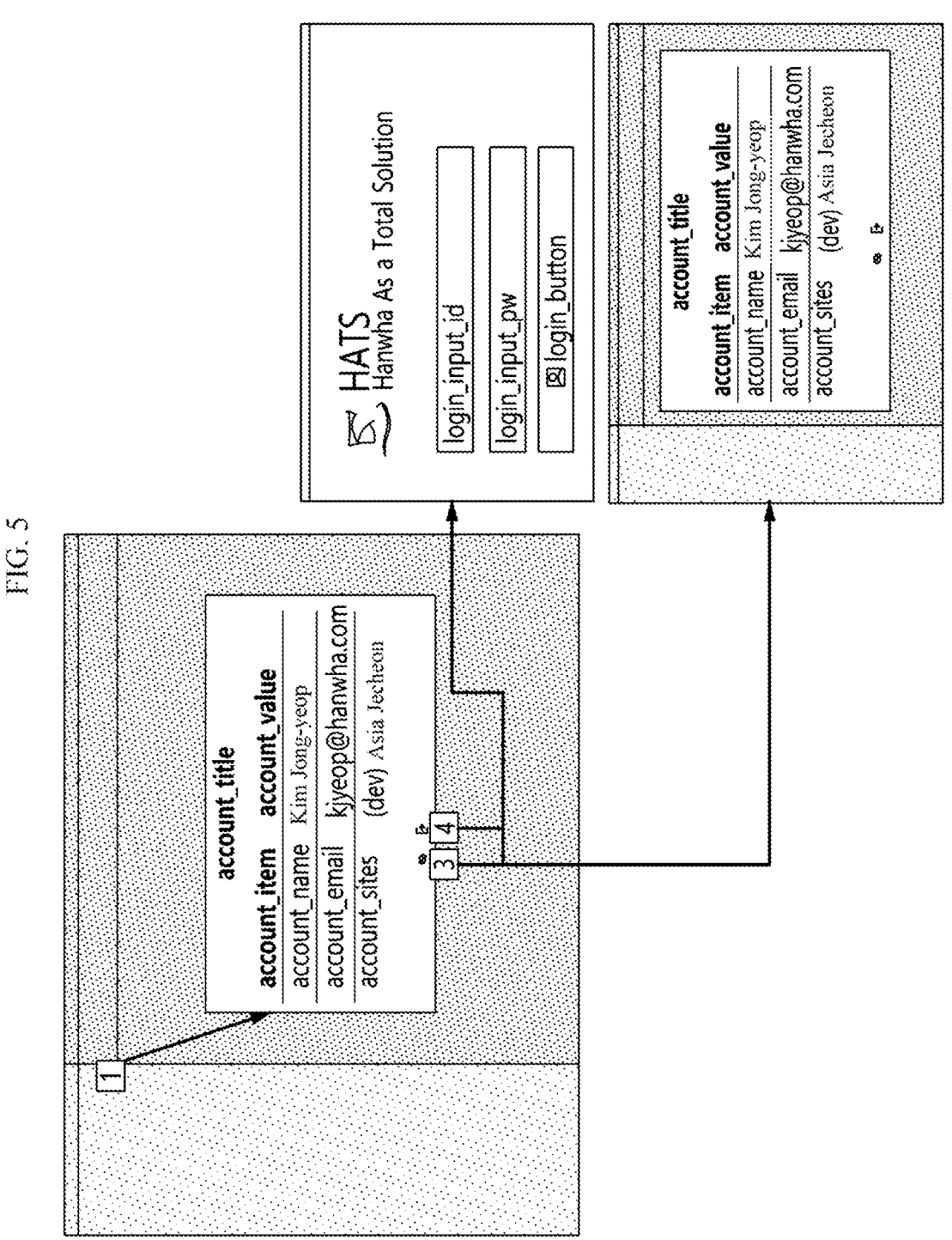

FIG. 5 is account information on a login screen, which displays 1. Account dialog call button, 2. Information of a corresponding account, 3. An apparatus deregistration button—if successful, move to the login screen, 3-1. When deregistration fails, a SnackBar is displayed and maintain the screen, and 4. Logout button-if successful, move to the login screen.

Figure 6:
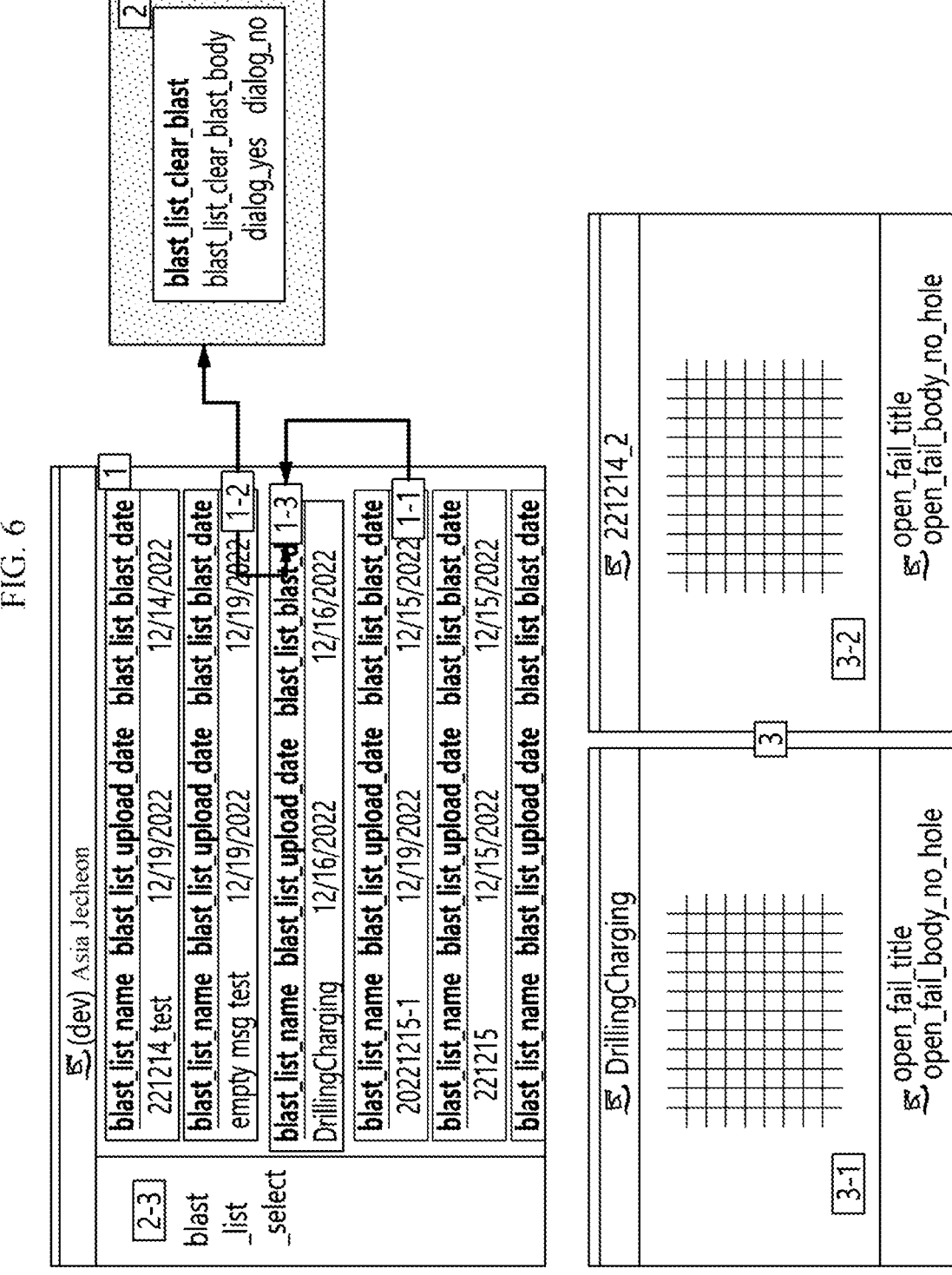

FIG. 6 is a blast list screen, which displays 1. Blast list-scroll when the number of lists exceeds the screen, a blast name, an upload date, a blast plan date, a drilling progress situation, a charging progress situation, display only blasts corresponding to the set period of Period to Show on a setting screen on the basis of the blast upload date, 1-1. Blast before "downloading" has dark color, 1-2. Blast after "downloading" has bright color, 1-3. Blast that is already selected will pop out, 2. Press Blast in a state of 1-2 long to delete blast locally, 3. Display SnackBar when Blast fails to load. 3-1. When there is no hole information in blasting, and 3-2. When distance between holes in blasting is too far.

Figure 7A:
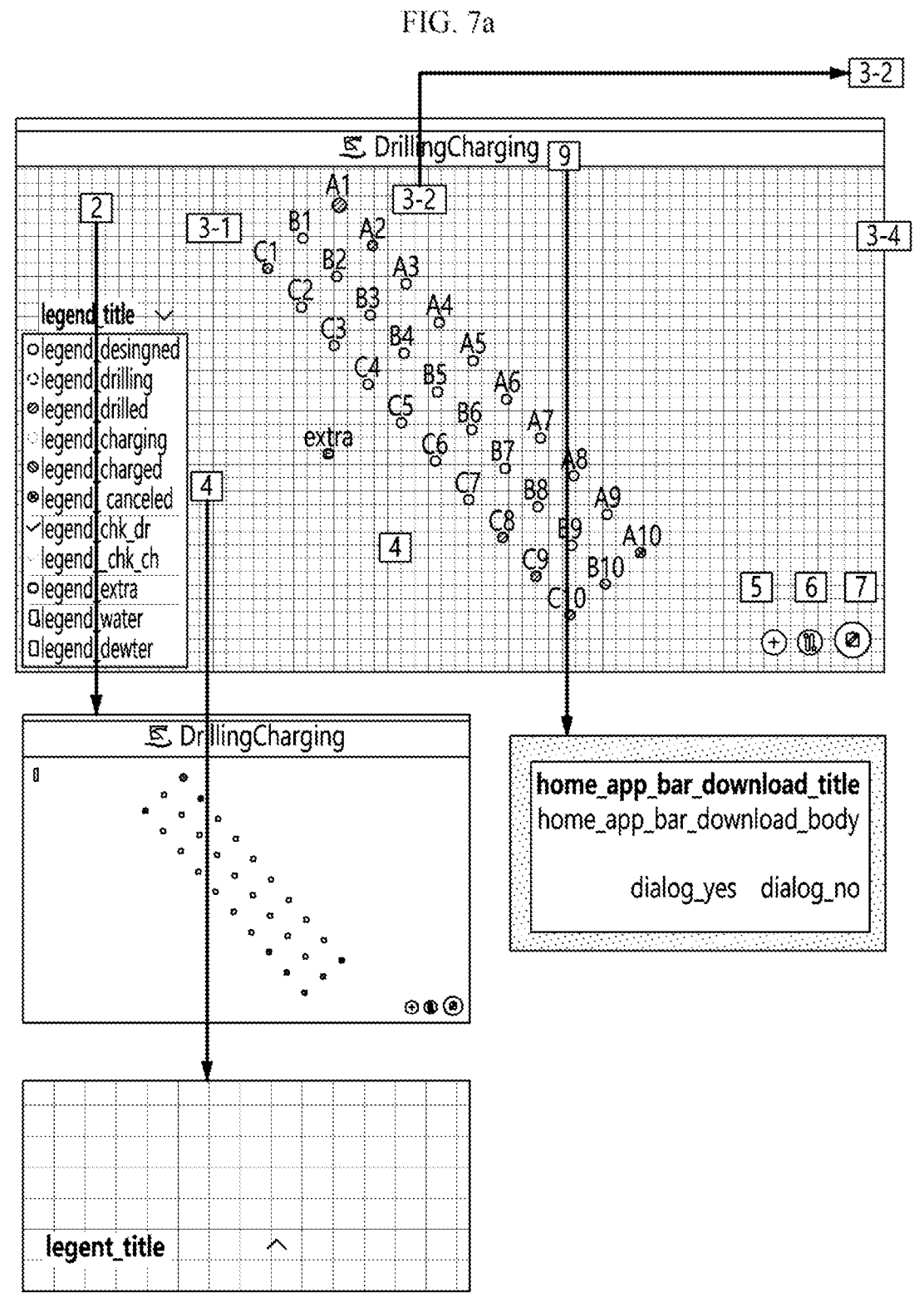
Figure 7B:
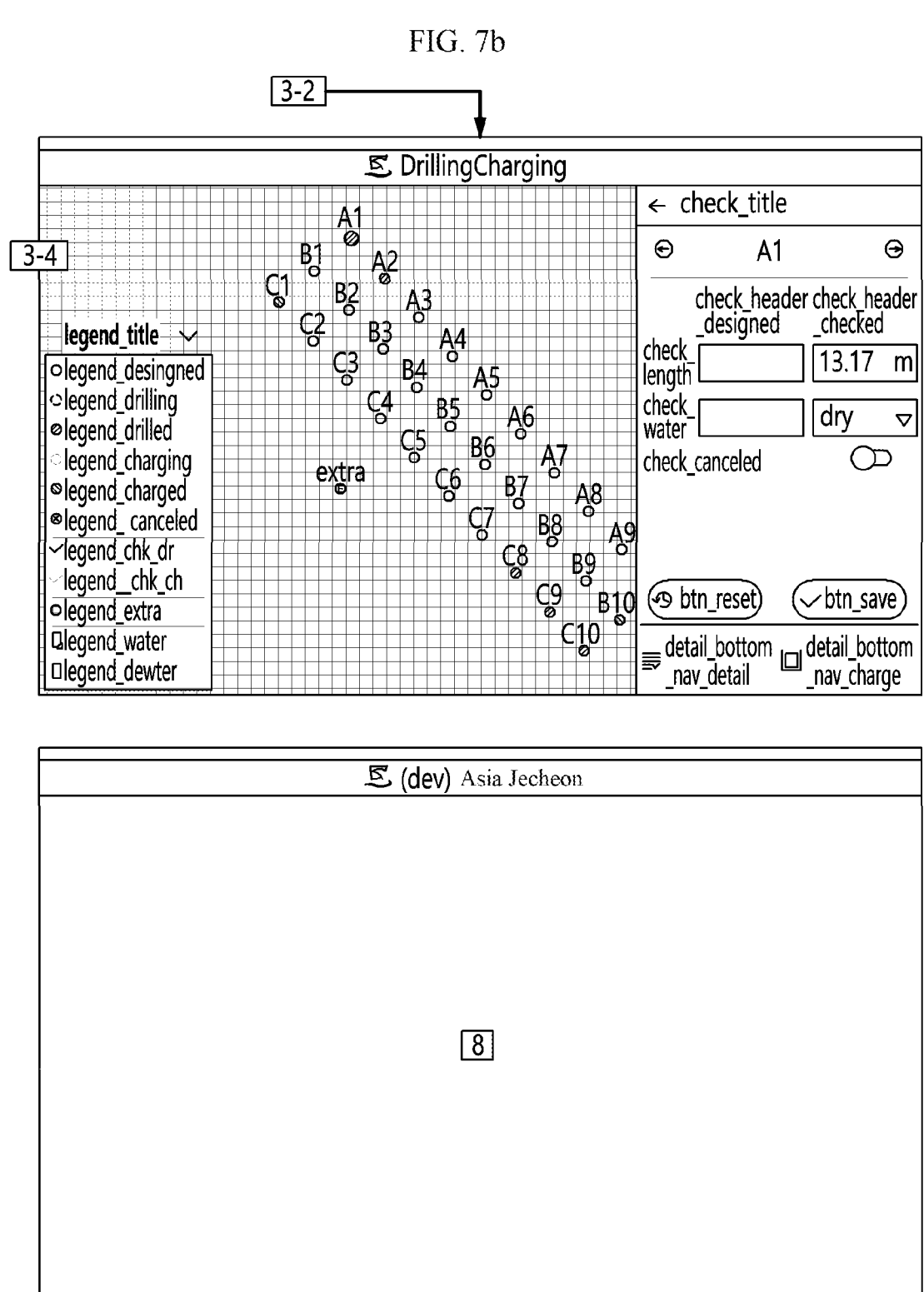

FIGS. 7a and 7b are hole checking screens which display 1. 2. Grid on/off button, 3. Hole Icon 3-1. Hole label (hole ID), 3-2. Display a selected hole (display in a big size), 3-4. When a hole icon is clicked, move to hole detail, 4. Hole Icon legend, 5. Extra hole function execution button, 6. Wiring path function execution button, 7. Hole detail function execution button, 8. When blast is not selected, 4-6 Hide floating button, and 9. Design file download button-display design uploaded by EagleDesigner when there is the design, and when there are any changes when Download is touched, a message box is displayed and only Yes is downloaded, but when there is no change, download progress and design screen are changed to downloaded design.

Figure 8:
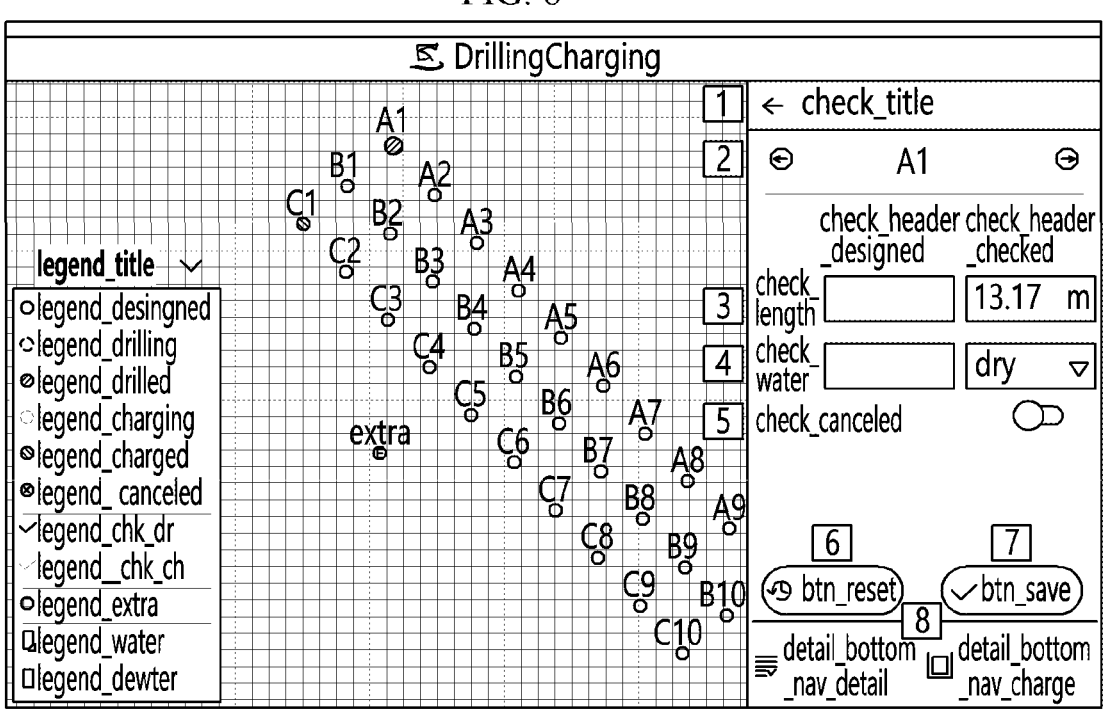

FIG. 8 is a hole detail screen, which displays 1. Back button, 2. Hole ID/Navigator-hole row and order are moved, and are cycled to beginning when moved to an end, 3. Length: 0~9999, second decimal place, 4. Water: cry, water, dewatered, 5. Cancel hole, 6. Reset button: Initialize to value downloaded from a server, and 7. Save button: local saving, and 8. Change menu of hole detail/charge design.

FIG. 9 is a charge design screen, which displays 1. Back button, 2. Hole ID/Navigator, 3. Hole information (schematic diagram), 3-1. Empty space, 3-2. Explosives deck, 3-3. Stemming deck, 4. Charge deck list-input limit: 0~9999, second decimal place, and in the case of a charged state, input is not possible-deactivation, 5. Timing deck list-Timing input limit: 0~9999, natural number, and in the case of a charged state, input is not possible-deactivation, 6. Reset button: restoration to data downloaded from a server (deactivation of unavailability in the case of a charged state), 7. Save button: local saving (deactivation of unavailability in the case of a charged state), and 8. Change menu of hole detail/charge design.

Figure 10:
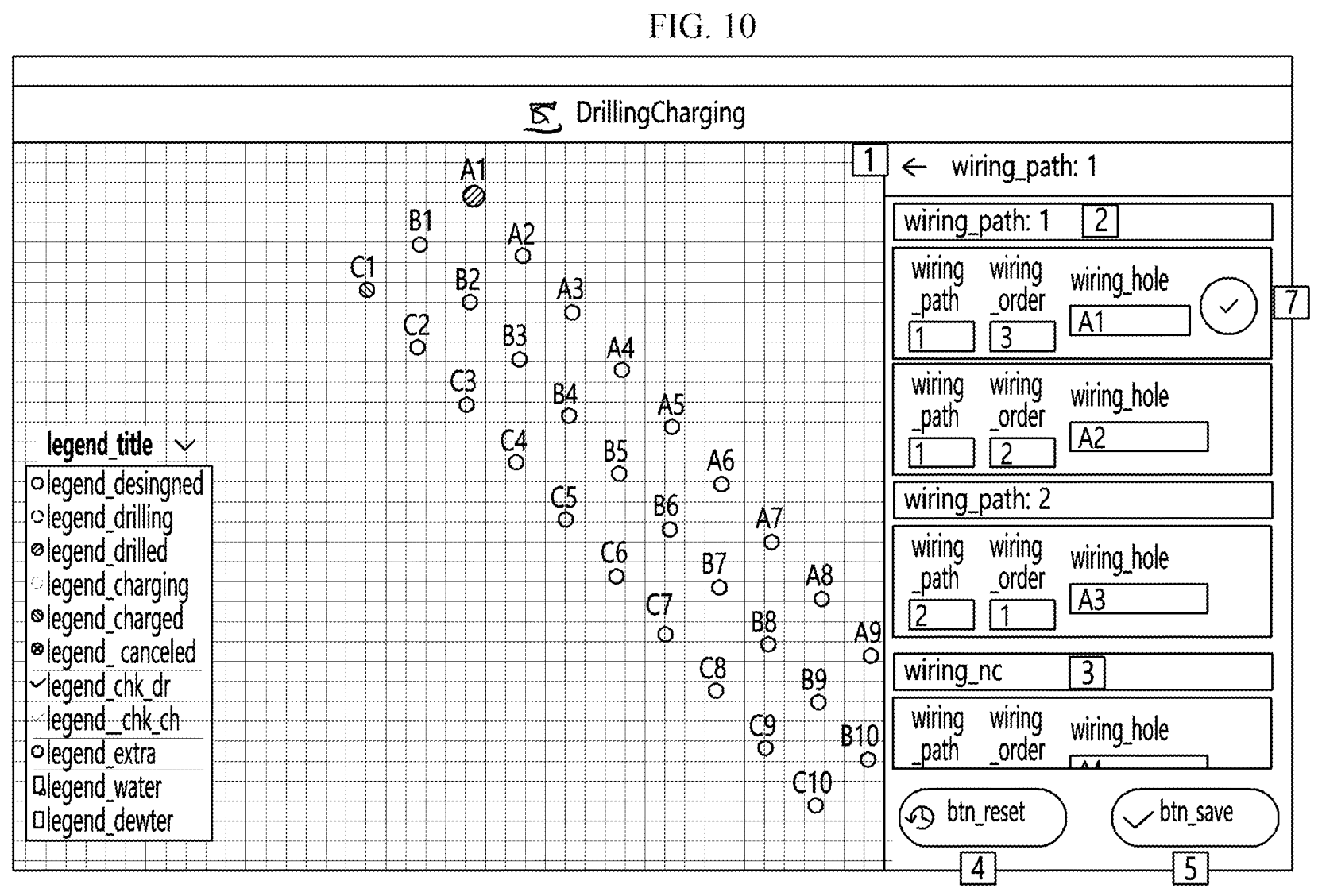

FIG. 10 is a wiring path screen, which displays 1. Back button, 2. Hole list for each path name—path name: 1~99, path order: 1~999, 3. Hole list without a wiring path, 4. Reset button: restoration to data downloaded from Server, 5. Save button: local saving, and 6. Submit button: when a TextField change occurs, the submit button is created, and the change is reflected only when the submit button is pressed.

Figure 11A:
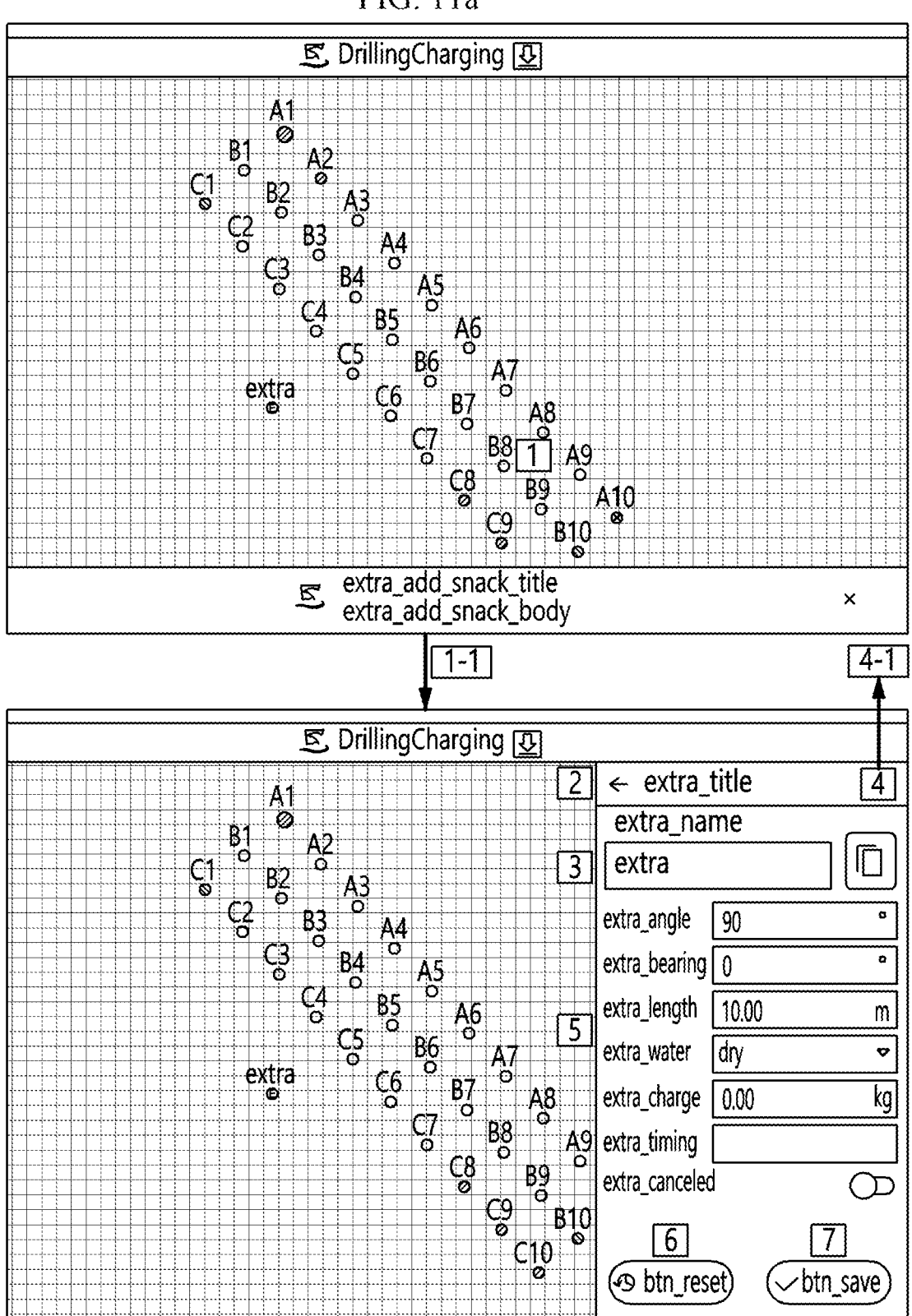
Figure 11B:
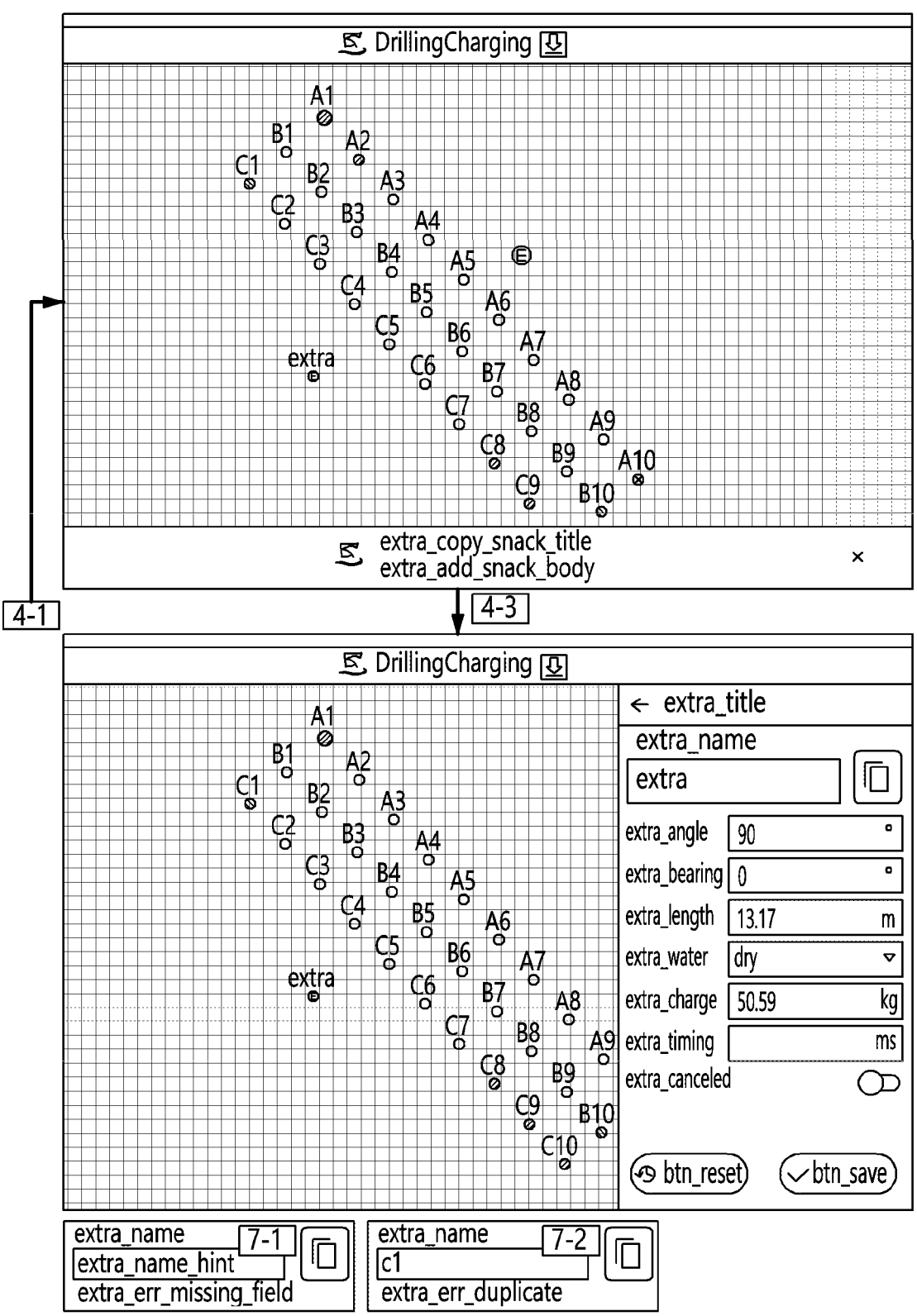
Figure 12A:
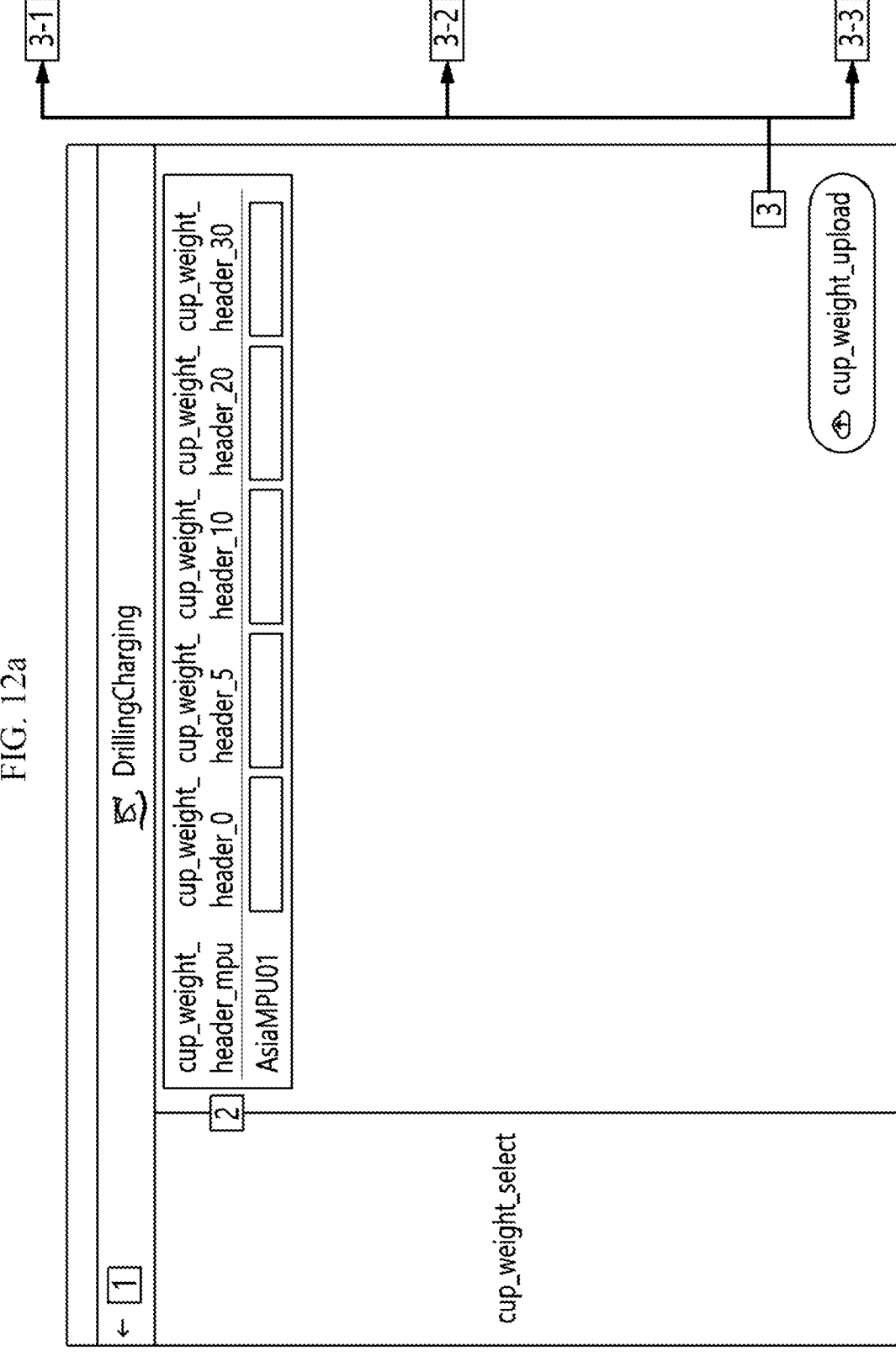

FIGS. 11a and 11b are extra hole screens, which display 1. Extra hole generation position selection, 1-1. When selecting (clicking/tapping) a position, detailed information is visible, 2. Back button, 3. Hole ID, 4. Copy button, 4-1. When clicking/tapping a copy button, details collapsed, 4-2. Select a hole whose information to be copied, 4-3. When a hole to be copied is selected, hole information is changed to information of the corresponding hole, detailed information is visible, copy drilling information and charging information excluding a hole name and coordinate information, 5. Hole information-Angle: 0~180 natural number, Bearing: 0~359 natural number, Length: 0~9999, second decimal place, Water: dry, water, dewatered, Charge (read only), Timing (read only), toggle a cancel hole, 6. Reset button: restoration to extra hole defaults-Angel: 90, Bearing: 0, Length: 10.0, Water: dry, Charge: 0/Charge &Timing Design: null, 7. Save button: Close a detailed information layer after local saving, 7-1. Error text when a hole ID is not entered, and 7-2. Error text when a hole ID is duplicated.

Figure 12D:
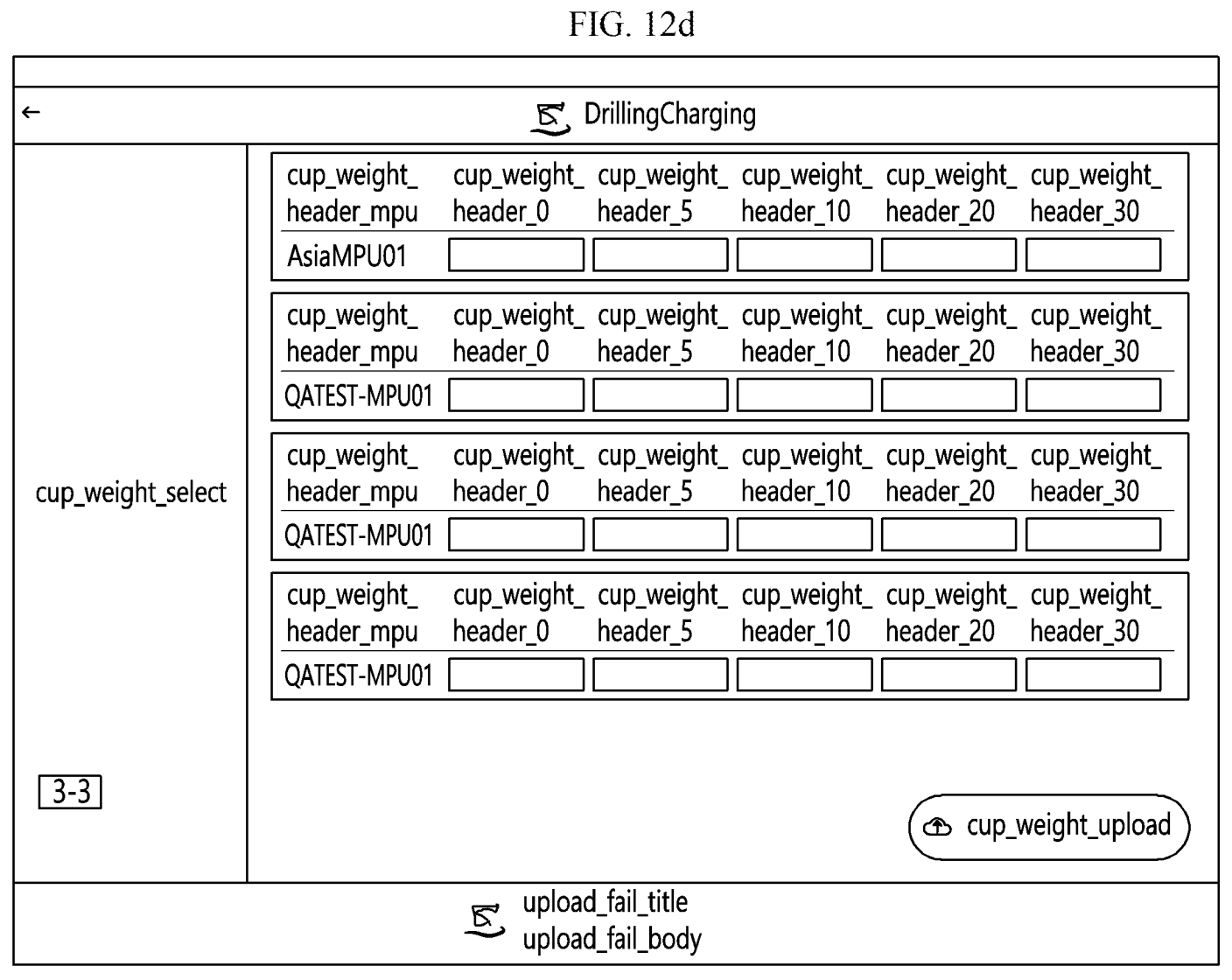

FIGS. 12a, 12b, 12c, and 12d are cup weight screens, which display 1. Back button: move to a previous screen and reset an input value, 2. List of MPU matched to blast-only the MPU of charge result uploaded to a server from the MPU is displayed in the list and cup weight can be entered, input limit: 0~99, second decimal place, 3. Upload button: save input cup weight in a server, 3-1. Inform upload success, 3-2. Inform upload failure (no network), and 3-3. Inform upload failure (others).

Figure 13A:
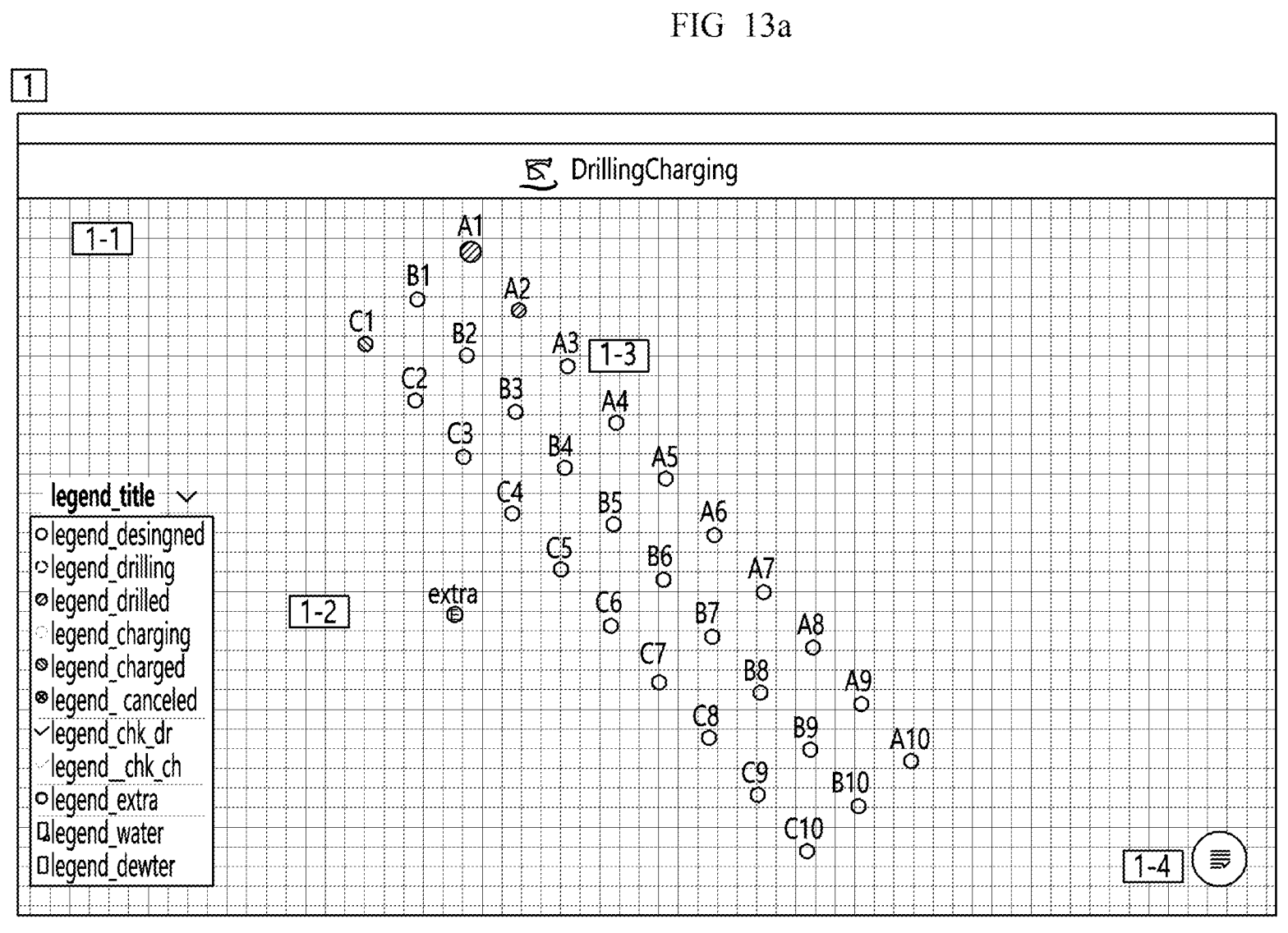
Figure 13B:
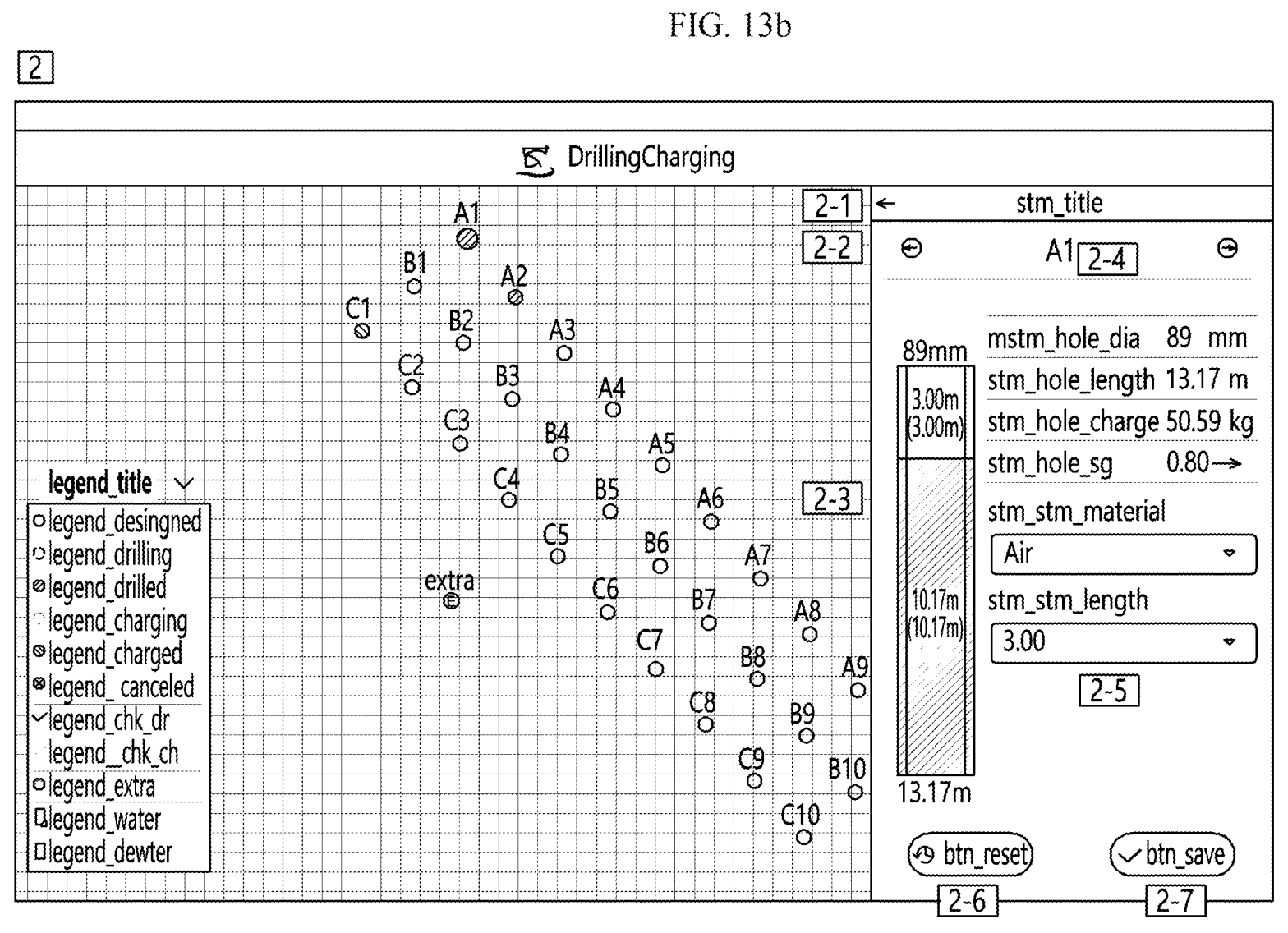

FIGS. 13a and 13b are stemming checking screens, which display 1. Stemming checking menu screen, 1-1. Grid on/off, 1-2. Legend, 1-3. Hole icon, 1-4. Stemming checking detail information button, 2. Stemming checking detail information is visible when clicking hole icon (1-3) or detail information button (1-4), and in the case of a canceled hole, it is not possible to enter a detail information screen, 2-1. Back button, 2-2. Hole ID/Navigator, 2-3. Hole information (a schematic diagram)—light color: Charge result or design data, dark color: Stemming checking data, explosives (orange color): All charge weights in a blast hole are converted to volume and displayed, stemming (gray color): Stemming length value (2-5) or Residual length excluding an explosive in the blast hole, 2-4. Hole information—when cup weight is not entered, S.G change amount is not displayed, and 2-5. Stemming information-initial hole length: Display stemming length default by calculating charge length, Stemming material: common code data (base: air) (display stemming items: air, airbag, cuttings, gravel, stemming plug, water), Stemming length: 0~99, second decimal place.

Figure 14A:
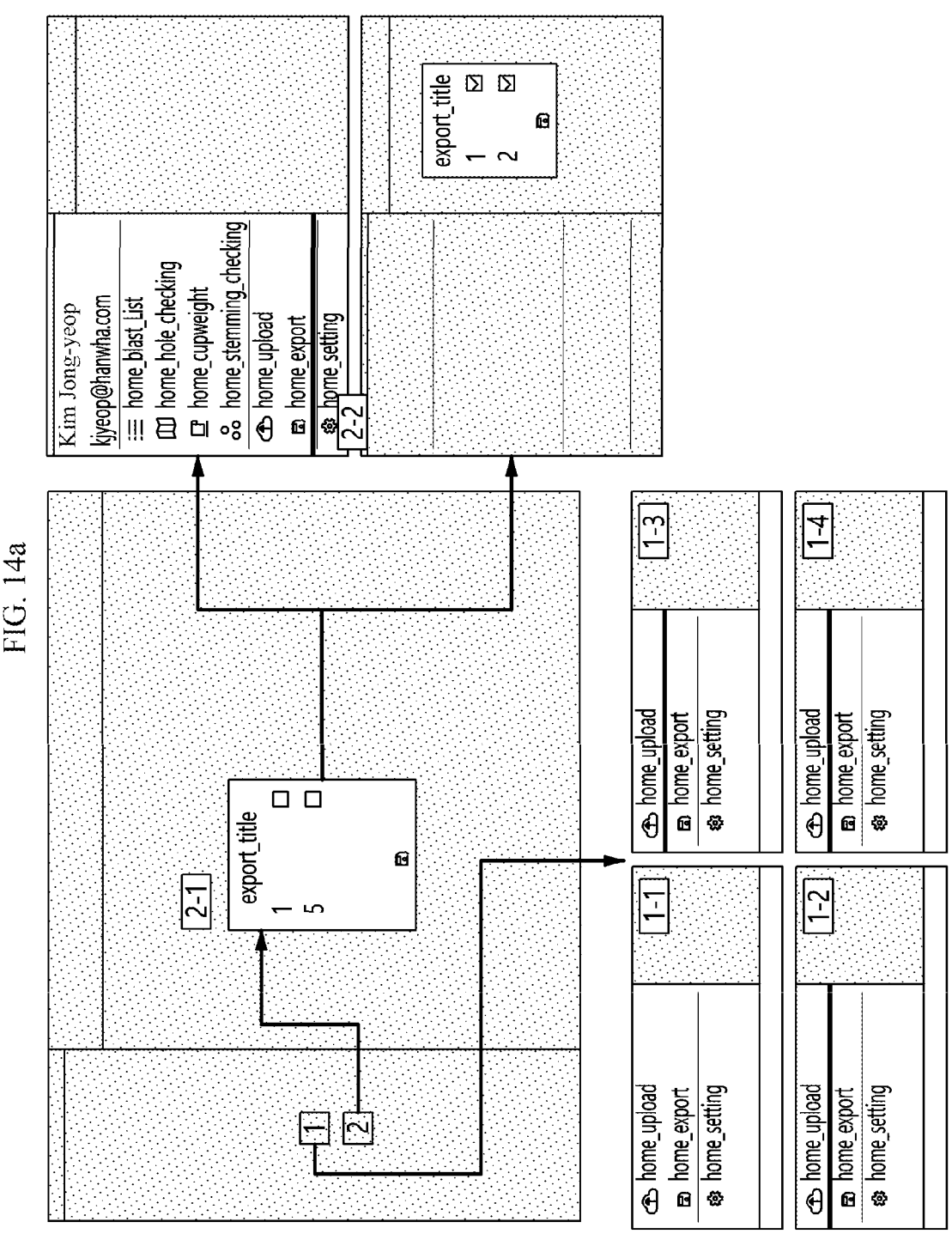
Figure 14B:
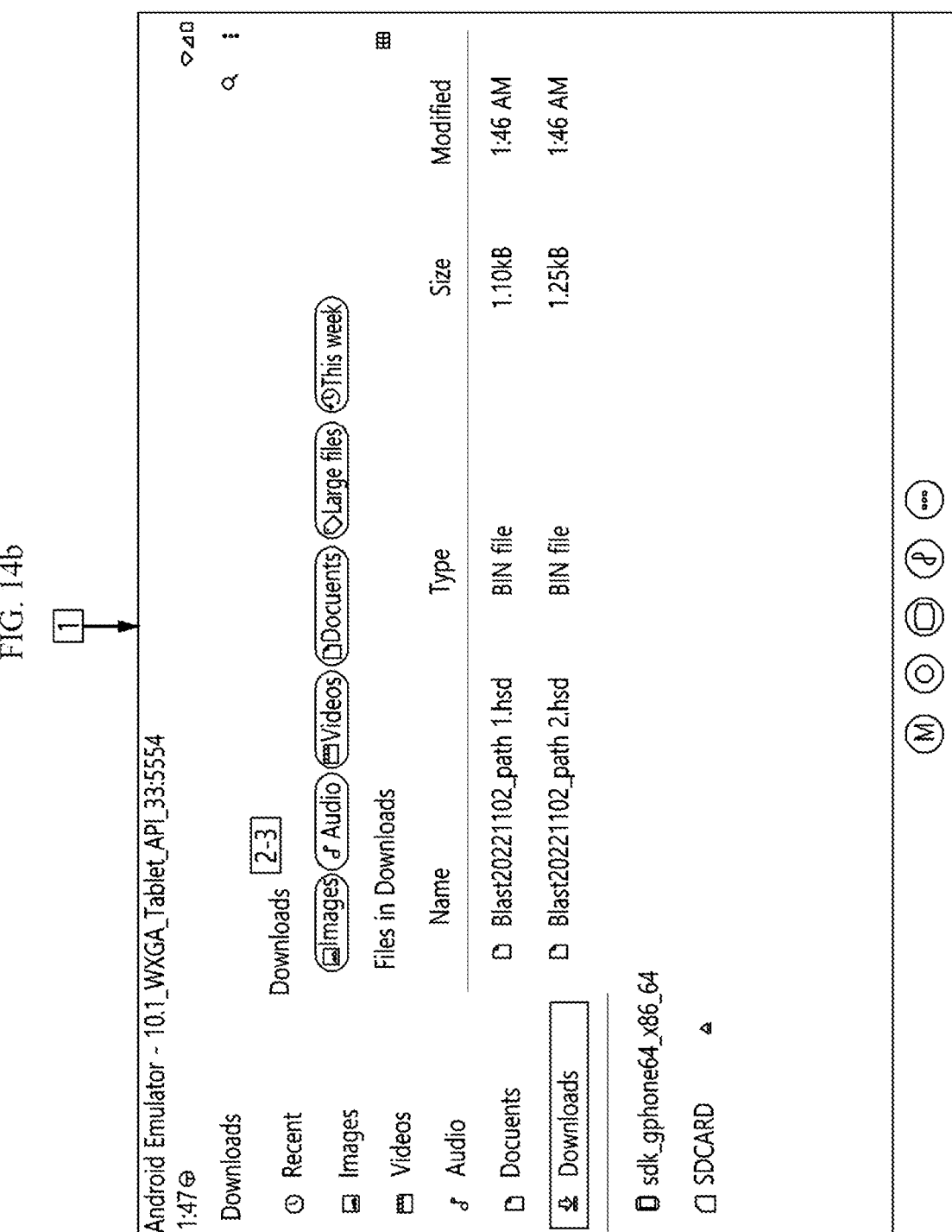

FIGS. 14a and 14b are data upload/output screens, which display 1. Upload button-upload changes to a server, and display progress and results as Progress bar/snackBar, 1-1. When upload is not performed (no changed hole), 1-2. When upload fails due to server connection failure, 1-3. When upload fails for other reasons, 1-4. When upload succeeds, 2. Export button-save electronic detonator file format (hsd), 2-1. Path selection dialog, 2-2. Display progress and results as ProgressBar/snackBar—inform success in case of success (for 4 seconds), and inform failure in case of failure (for 2 seconds), and 2-3. Export file location and file name in Android-save in Android user Download and save as blast name_PathName.hsd.

Figure 15:
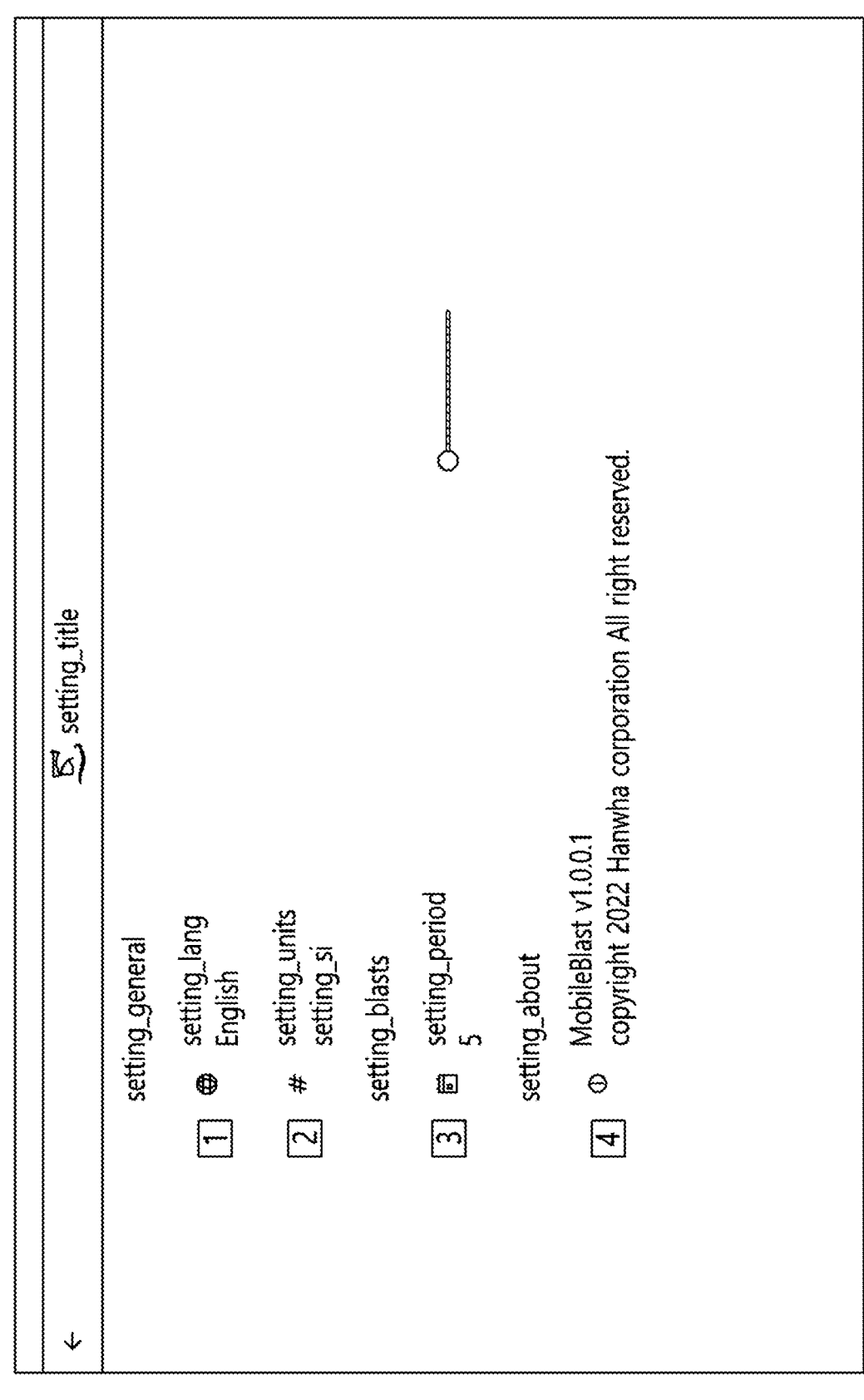

FIG. 15 is a settings screen, which displays 1. Multilingual settings-temporarily enabled for multilingual verification, 2. Set a unit system, 3. Set the display period of a blast list, and 4. Program information.

The functional operations described in this specification and the embodiments related to the present subject matter can be implemented in digital electronic circuits, computer software, firmware, or hardware, or in a combination of at least two thereof, including the structures disclosed in this specification and their structural equivalents.

The embodiments of the subject matter described in the present specification may be implemented as at least one module for one or more computer program commands encoded on a tangible program medium for execution by one or more computer program products, that is, a data processing device or for controlling the operation. The tangible program medium may be a radio signal or computer readable medium. The radio signal is an artificially generated signal such as a machine-generated electrical, optical or electromagnetic signal, which is generated for encoding information to be transmitted to a suitable receiver device for execution by a computer. The computer readable medium may be a machine readable storage device, a machine readable storage substrate, a memory device, a combination of materials that affect a machine readable radio signal, or a combination of at least two thereof.

Additionally, a logic flow and structural block diagrams described in this patent document describe corresponding actions and/or specific methods supported by corresponding functions and steps supported by the disclosed structural means and can be used to establish corresponding software structures and algorithms and equivalents thereof.

The present description presents the best mode of the present disclosure, and provides examples to describe the present disclosure and to enable those skilled in the at to manufacture and use the apparatus of the present disclosure. The specification prepared in this way does not limit the present disclosure to specific terms presented.

Accordingly, although the present disclosure has been described in detail with reference to the above-described examples, those skilled in the art may make modifications, and changes, and variations of the present examples without departing from the scope of the present disclosure. In short, in order to achieve the intended effects of the present disclosure, it is not necessary to separately include all function blocks shown in the drawings or to follow all the order shown in the drawings in the same order shown. It should be noted that even if not, the present disclosure may fall within the technical scope of the claims.

The invention claimed is:

1. An apparatus for operating a blasting management application, the apparatus comprising:

a worker login execution part configured to perform a login to a blasting management application through a worker terminal;

a blast list providing part configured to provide blast lists selected through the worker terminal to the worker terminal;

a blast hole checking information providing part configured to generate and provide blast hole checking information by receiving blast hole information comprising at least one of blast hole detail information, blast hole design information, blast hole arrangement information, and additional blast hole information for blast design work of at least one of the blast lists selected through the worker terminal;

a blast hole apparent specific gravity information providing part configured to receive and provide apparent specific gravity information of a blast hole applied to the blast design work selected through the worker terminal; and a blast hole stemming checking information providing part configured to generate and provide blast hole stemming checking information by receiving stemming information of the blast hole applied to the blast design work selected through the worker terminal, wherein when charging an explosive into the blast hole, the blast hole apparent specific gravity information providing part receives the apparent specific gravity information according to a weight of the blast hole measured according to change of time after placing the explosive in a measuring cup, wherein the blast hole stemming checking information providing part calculates a volume of explosives charged into the blast hole using the apparent specific gravity information of the explosive, and provides information to worker terminal how much space is left for proceeding with stemming work, and wherein the blast hole stemming checking information providing part generates and provides the blast hole stemming checking information on a basis of blast hole stemming information comprising at least one of an initial length of the blast hole, a volume of an explosive charged in the blast hole, a type of a stemming material filled in space remaining after charging the explosive into the blast hole, and a length of the stemming material excluding the explosive inside the blast hole.

2. The apparatus of claim 1, wherein the blast list providing part provides a blast design work list comprising at least one of an explosion name, an upload date, a blast plan date, a drilling progress situation, and a charging progress situation.

3. The apparatus of claim 1, wherein the blast hole checking information providing part comprises:

a blast bole detail information generation part configured to generate blast hole detail information comprising at least one of an ID, a position, a size, and a weight of each of multiple blast holes;

a blast bole design information generation part configured to generate blast hole design information comprising at least one of deck charging information and deck timing information of each of multiple blast holes;

a blast hole arrangement information generation part configured to generate blast hole arrangement information comprising arrangement information for each path in which multiple blast holes are located; and an additional blast hole information generation part configured to generate information of at least one additional blast hole.

4. The apparatus of claim 1, further comprising:

a setting part configured to set a language displayed in the blasting management application, to set a display period of the blast list, and to set a unit system through the worker terminal.

5. A method for operating a blasting management application, the method comprising:

performing a login to a blasting management application through a worker terminal;

providing blast lists selected through the worker terminal to the worker terminal;

generating and providing blast hole checking information by receiving blast hole information comprising at least one of blast hole detail information, blast hole design information, blast hole arrangement information, and additional blast hole information for blast design work of at least one of the blast lists selected through the worker terminal;

receiving and providing apparent specific gravity information of a blast hole applied to the blast design work selected through the worker terminal; and generating and providing blast hole stemming checking information by receiving stemming information of the blast bole applied to the blast design work selected through the worker terminal, wherein in the receiving and providing of apparent specific gravity information of a blast hole applied to the blast design work, when charging an explosive into the blast hole, the apparent specific gravity information according to a weight of the blast hole measured according to change of time after placing the explosive in a measuring cup is received, wherein in the generating and providing of blast hole stemming checking information by receiving stemming information of the blast hole applied to the blast design work, a volume of explosives charged into the blast hole using the apparent specific gravity information of the explosive is calculated, and information to worker terminal how much space is left for proceeding with stemming work is provided, and wherein in the generating and providing of blast hole stemming checking information by receiving stemming information of the blast hole applied to the blast design work, the blast hole stemming checking information is generated and provided on a basis of blast hole stemming information comprising at least one of an initial length of the blast hole, a volume of an explosive charged in the blast hole, a type of a stemming material filled in space remaining after charging the explosive into the blast hole, and a length of the stemming material excluding the explosive inside the blast hole.

6. The method of claim 5, wherein in the providing of the blast lists to the worker terminal, a blast design work list comprising at least one of an explosion name, an upload date, a blast plan date, a chilling progress situation, and a charging progress situation is provided.

7. The method of claim 5, wherein the generating and providing of blast hole checking information by receiving blast hole information comprising at least one of blast hole detail information, blast hole design information, blast hole arrangement information, and additional blast bole information for blast design work of at least one of blast lists comprises:

generating blast hole detail information comprising at least one of an ID, a position, a size, and a weight of each of multiple blast holes;

generating blast hole design information comprising at least one of deck charging information and deck timing information of each of multiple blast holes;

generating blast hole arrangement information comprising arrangement information for each path in which multiple blast holes are located; and generating information of at least one additional blast hole.

* * * * *